3,472,869
DIBENZOCYCLOOCTADIENE COMPOUNDS
Leslie G. Humber, Dollard des Ormeaux, Quebec, Canada, assignor to American Home Products Corporation, New York, N.Y., a corporation of Delaware
No Drawing. Filed Aug. 10, 1966, Ser. No. 571,439
Int. Cl. C07d 27/02, 63/12, 31/32
U.S. Cl. 260—326.5      15 Claims This application is a continuation-in-part of my copending application, Ser. No. 464,183, filed June 15, 1965, now U.S. Patent No. 3,317,543.

This invention relates to certain novel derivatives of 2,3,6,7-dibenzo-2,6-cyclooctadiene, containing substituents in the 1-position. These derivatives possess valuable pharmacological properties and this invention also relates to a process for the preparation of said derivatives.

The new pharmacologically active compounds of this invention may be represented by the generic structural Formula I.

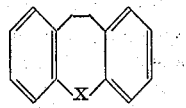

wherein X may be

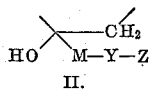 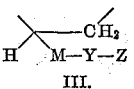 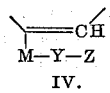

II.          III.         IV.

where Y may be an aromatic moiety such as, for example, phenyl, pyridyl, pyrazinyl, thienyl, or furyl and Z is a lower aminoalkyl, lower alkylaminoalkyl, lower dialkylamino or a pyrrolidino-lower alkyl group, containing from three to twenty carbon atoms, and wherein M represents a valency bond or the methylene group.

More particularly, the compounds of my invention to which this continuation-in-part application is directed are those of the formula

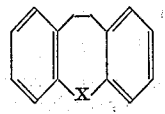

wherein X may be

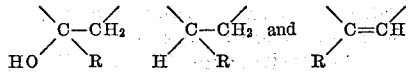

wherein R represents the 2-dimethylaminomethylphenyl, 4 - dimethylaminophenyl, 2 - dimethylaminomethylbenzyl, or the 2-pyrrolidinomethylphenyl group.

The dibenzocyclooctadiene derivatives of this invention are basic in nature and form acid addition salts. Such salts with pharmacologically acceptable acids are biologically equivalent to the free base. The compounds of this invention are useful as antiinflammatory, antibacterial, trichomonicidal and antigonadotrophic agents.

The compounds of this invention may be administered orally, by injection, or topically. For oral administration they may be formulated with excipients such as, starch, lactose, magnesium silicate and magnesium stearate in the form of tablets or capsules containing from 5–500 mg. of the active ingredient. Such tablets or capsules may be administered up to five times per day.

For injection, the free bases of this invention may be dissolved under sterile conditions in oily vehicles such as, for example, sesame oil or olive oil, at concentrations of from 1 to 20 mg./ml.

For topical administration the compounds of this invention may be formulated in the form of creams, ointments, jellies, lotions or dusting powders, containing from 0.1 to 1 percent of the active ingredient.

The compounds of this invention are conveniently prepared by reacting compound I with X=—CO—CH$_2$ (Leonard et al., J. Am. Chem. Soc. 77, 5078 (1955)) with a compound of the formula M—Y—Z in the presence of a suitable basic condensing agent such as, for example, an alkali metal amide, alkoxide, alkyl, or aryl, to yield the corresponding 1-hydroxy derivatives of Formula I in which X represents the group II.

Alternatively, the compounds of this invention in which X represents the group II may also be prepared by reacting the compound of Formula I in which $$X=CO—CH_2—$$

with a Grignard reagent prepared from a halo derivative of M—Y—Z, of the formula HalM—Y—Z in which Hal represents a halogen with an atomic weight greater than 19.

The latter compounds may be treated with an appropriate dehydrating agent such as, for example, a mineral acid or an organic anhydride, to yield the corresponding olefins of Formula I in which X represents the group IV, and the latter compounds may be hydrogenated, for example, with hydrogen in the presence of a noble metal catalyst to yield the saturated compounds of Formula I in which X represents the group III.

Alternatively, the last-named compounds may be obtained directly from the compounds of Formula I in which X represents the group II by treatment with a suitable hydrogenolyzing agent such as, for example, hydrogen iodide and red phosphorus, or hydrogen in the presence of a noble metal catalyst.

The compounds of generic Formula I may be transformed to salts by reacting them with a pharmacologically acceptable acid.

The examples which follow serve to illustrate my invention.

EXAMPLE 1

1-hydroxy-1-(2-dimethylaminoethylphenyl)-2,3,6,7-dibenzo-2,6-cyclooctadiene

Benzyldimethylamine (5.06 gm., 0.037 mole) is lithiated in the ortho position with butyl lithium (0.45 mole) in ether with stirring at room temperature for 24 hours. The resulting mixture is added over one half hour to a refluxing ether solution (75 ml.) of 2,3,6,7-dibenzo-2,6-cyclooctadienone (11.0 gm., 0.0495 mole). The reaction mixture is worked up in the conventional manner to yield some non-basic material identified as the starting ketone. The basic fraction is a mixture of starting amine and title compound as indicated by thin layer chromatography. The title compound is separated by crystallization from a chloroform-ether mixture to be obtained as a solid with M.P. 196–197° C. recrystallized from chloroform-ether to M.P. 197–198° C.

EXAMPLE 2

1-(2-dimethylaminomethylphenyl)-2,3,6,7-dibenzo-2,6,8-cyclooctatriene

1 - hydroxy-1-(2-dimethylaminomethylphenyl)-2,3,6,7-dibenzo-2,6-cyclooctadiene (15 gm.), obtained as in Example 1, is dissolved in acetic anhydride (150 ml.) and heated to reflux for three hours. The mixture is cooled and added slowly to ice-cold aqueous sodium hydroxide. The precipitated title product is washed well with water and crystallized from isopropanol.

EXAMPLE 3

1-(2-dimethylaminomethylphenyl)-2,3,7-dibenzo-2,6-cyclooctadiene

1 - hydroxy-1-(2-dimethylaminomethylphenyl)-2,3,6,7-dibenzo-2,6-cyclooctadiene (10.0 gm.), prepared as in Example 1, is dissolved in a mixture of glacial acetic acid (100 ml.) and 56 percent hydriodic acid (100 ml.) containing red phosphorus (10.0 gm.). The mixture is refluxed for 24 hours, filtered while hot and the filtrate evaporated in vacuo. The resultant residue is distributed between chloroform and aqueous sodium hydroxide. The chloroform phase yields the title product after drying and evaporation.

EXAMPLE 4

The compounds obtained in Examples 1, 2 and 3 are treated in ether solution with hydrogen chloride to obtain the corresponding hydrochloride salts of 1-hydroxy-1 - (2 - dimethylaminomethylphenyl)-2,3,6,7-dibenzo-2,6-cyclooctadiene, 1-(2-dimethylaminomethylphenyl)-2,3,6,7-dibenzo-2,6,8-cyclooctatriene, and 1-(2-dimethylaminomethylphenyl)-2,3,7-dibenzo-2,6-cyclooctadiene.

EXAMPLE 5

1-hydroxy-1-(2-dimethylaminomethylbenzyl)-2,3,6,7-dibenzo-2,6-cyclooctadiene 2-(dimethylaminomethyl)-toluene (17.90 gm., 0.12 mole), dissolved in ether (250 ml.), is treated with n-butyl lithium (84.6 ml. of a 1.7 N solution in heptane) and the mixture is allowed to remain at room temperature overnight. To the resultant suspension of 2-(dimethylaminomethyl)-benzyl lithium in refluxing ether is added over 30 minutes, 2,3,6,7-dibenzo[2,6]cyclooctadiene-1-one (17.80 gm., 0.08 mole) dissolved in 200 ml. of ether. Refluxing is continued for two hours, then 200 ml. of water is added. The ether phase is separated, washed with water, treated with charcoal and dried with sodium sulfate. Concentration of the ether extracts and crystallization from acetone yields the product, M.P. 120–123° C. Its empirical formula $C_{26}H_{29}NO$ is confirmed by elemental analysis.

EXAMPLE 6

1-hydroxy-1-(2-pyyrolidinomethylphenyl)-2,3,6,7-dibenzo-2,6-cyclooctadiene

N-benzylpyrrolidine (29.1 gm., 0.18 mole) in ether (200 ml.) is treated with n-butyl lithium (126.9 ml. of a 1.7 N solution in heptane) and the mixture is kept at room temperature for 16 hours. To this solution is added at room temperature 2,3,6,7-dibenzo[2,6]cyclooctadiene-1-one (26.7 gm., 0.12 mole) in 250 ml. of ether over a period of 60 minutes. The reaction mixture is then refluxed for 2.5 hours, then cooled, and treated with 300 ml. of water. The organic phase is separated, washed, dried, (Na₂SO₄) and evaporated to yield a residue which is crystallized from an acetone-hexane mixture to give the product, M.P. 165–166° C. The empirical formula $C_{27}H_{29}NO$ is confirmed by empirical analysis.

EXAMPLE 7

1-(4-dimethylaminophenyl)-2,3,6,7-dibenzo-2,6,8-cyclooctatriene p-Bromo-N,N-dimethylaniline (20.0 gm., 0.1 mole) in tetrahydrofuran (120 ml.) is added to magnesium (2.44 gm., 0.1 mole) in tetrahydrofuran (40 ml.) containing a catalytic amount of ethyl bromide. The Grignard mixture is refluxed for 2 hours, cooled and treated dropwise with a solution of 2,3,6,7-dibenzo[2,6]cyclooctadiene-1-one (22.2 gm., 0.1 mole) in tetrahydrofuran (120 ml.). The mixture is refluxed for 2 hours, cooled and treated with saturated aqueous ammonium chloride solution (70 ml.). The tetrahydrofuran phase is concentrated and treated with excess ethereal hydrogen chloride to yield the hydrochloride salt of the product, M.P. 209–210° C. when crystallized from ethanol. The product, in the form of the free base, is obtained from the salt by conventional procedures. It has M.P. 120–122.5° C. and its empirical formula $C_{24}H_{23}N$ is confirmed by analysis.

EXAMPLE 8

1-(2-dimethylaminomethylbenzyl)-2,3,6,7-dibenzo-2,6,8-cyclooctatriene 1-hydroxy-1-(2-dimethylaminomethylbenzyl) - 2,3,6,7-dibenzo-2,6-cyclooctadiene (8.0 gm., 0.022 mole) is refluxed in a mixture of acetic acid (120 ml.) and concentrated hydrochloric acid (12 ml.) for 3 hours. The solvents are removed in vacuo and the residue is distributed between chloroform and 10% aqueous sodium hydroxide. The chloroform phase yields the product, M.P. 195–200° C., from ethanol. The hydrochloride salt is prepared with ethereal hydrogen chloride. It has M.P. 217.5–218° C., from ethanol, and its empirical formula $C_{26}H_{28}ClN$ is confirmed by elemental analysis.

EXAMPLE 9

1-(2-pyrrolidinomethylphenyl)-2,3,6,7-dibenzo-2,6,8-cyclooctatriene 1-hydroxy-1-(2-pyrrolidinomethylphenyl) - 2,3,6,7-dibenzo-2,6-cyclooctadiene (10.9 gm., 0.028 mole) is refluxed with glacial acetic acid (164 ml.) and concentrated hydrochloric acid (16.4 ml.) for 3 hours. The reaction mixture is worked up in the usual manner to give the product as a gum. The hydrochloride salt is prepared with ethereal hydrogen chloride and on crystallization from an ethanol-acetone mixture, has M.P. 224–225° C. The empirical formula $C_{27}H_{28}ClN$ is confirmed by elemental analysis.

I claim:

1. A compound selected from the group which consists of compounds of the formula

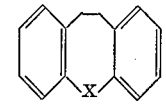

wherein X is selected from the group which consists of

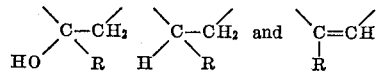

and R is selected from the group consisting of 2-dimethylaminomethylphenyl, 4-dimethylaminophenyl, 2-dimethylaminoethylbenzyl and 2-pyrrolidinomethylphenyl; and their hydrochloride salts.

2. 1 - hydroxy - 1 - (2 - dimethylaminomethylphenyl)-2,3,6,7-dibenzo-2,6-cyclooctadiene, as claimed in claim 1.

3. 1 - (2 - dimethylaminomethylphenyl) - 2,3,6,7 - dibenzo-2,6,8-cyclooctatriene, as claimed in claim 1.

4. 1 - (2 - dimethylaminomethylphenyl) - 2,3,6,7 - dibenzo-2,6-cyclooctadiene, as claimed in claim 1.

5. 1 - hydroxy - 1 - (2 - dimethylaminomethylbenzyl) 2,3,6,7-dibenzo-2,6-cyclooctadiene, as claimed in claim 1

6. 1 - hydroxy - 1 - (2 - pyrrolidinomethylphenyl) 2,3,6,7-dibenzo-2,6-cyclooctadiene, as claimed in claim 1.

7. 1 - (4 - dimethylaminophenyl) - 2,3,6,7 - dibenzo-2,6,8-cyclooctatriene, as claimed in claim 1.

8. 1 - (2 - dimethylaminomethylbenzyl) - 2,3,6,7-dibenzo-2,6,8-cyclooctatriene, as claimed in claim 1.

9. 1 - (2 - pyrrolidinomethylphenyl) - 2,3,6,7 - dibenzo-2,6,8-cyclooctatriene, as claimed in claim 1.

10. The hydrochloride salt of 1-hydroxy-1-(2-dimethylaminomethylphenyl) - 2,3,6,7 - dibenzo - 2,6 - cyclooctadiene, as claimed in claim 1.

11. The hydrochloride salt of 1-(2-dimethylaminomethylphenyl)-2,3,6,7-dibenzo - 2,6,8 - cyclooctatriene, as claimed in claim 1.

12. The hydrochloride salt of 1-(2-dimethylaminomethylphenyl)-2,3,6,7-dibenzo - 2,6 - cyclooctadiene, as claimed in claim 1.

13. The hydrochloride salt of 1-(4-dimethylaminophenyl)-2,3,6,7-dibenzo-2,6,8-cyclooctatriene, as claimed in claim 1.

14. The hydrochloride salt of 1-(2-dimethylaminomethylbenzyl)-2,3,6,7-dibenzo-2,6,8-cyclooctatriene, as claimed in claim 1.

15. The hydrochloride salt of 1-(2-pyrrolidinomethylphenyl)-2,3,6,7-dibenzo-2,6,8-cyclooctatriene, as claimed in claim 1.

References Cited

UNITED STATES PATENTS 3,389,177  6/1968  Adank et al. _____ 260—570.8

ALEX MAZEL, Primary Examiner

J. A. NARCAVAGE, Assistant Examiner

U.S. Cl. X.R.

260—250, 290, 296, 297, 326.81, 329, 332.3, 346.1, 347.7, 570.8, 570.9, 571, 576; 424—250, 263, 274, 275, 285, 330